(12) United States Patent
Boncoglu

(10) Patent No.: US 6,470,527 B1
(45) Date of Patent: Oct. 29, 2002

(54) ENVIRONMENTALLY FRIENDLY WINDSHIELD WIPER AND CLEANING ASSEMBLY

(75) Inventor: Ali Boncoglu, 11952 boul. Laurentian, Apt. 1, Montreal QC (CA), H4K 1M7

(73) Assignee: Ali Boncoglu, Montreal (CA)

( * ) Notice: Subject to any disclaimer, the term of this patent is extended or adjusted under 35 U.S.C. 154(b) by 0 days.

(21) Appl. No.: 09/722,220

(22) Filed: Nov. 27, 2000

(51) Int. Cl.[7] .............................. B60S 1/48; B60S 1/46; B60S 1/28; B60S 1/38
(52) U.S. Cl. ................ 15/250.04; 15/250.01; 15/250.41; 15/250.02
(58) Field of Search .................... 15/250.04, 250.01, 15/250.02, 250.05, 250.06, 250.07, 250.41, 250.4, 250.48; 239/284.1

(56) References Cited

U.S. PATENT DOCUMENTS

| 1,745,246 A | * | 1/1930 | Colley | ...................... 15/250.07 |
| 1,982,345 A | * | 11/1934 | Kirby | ............................ 15/103 |
| 3,342,164 A | * | 9/1967 | Lewis | |
| 3,418,676 A | * | 12/1968 | Byczkowski et al. | .... 15/250.04 |
| 3,716,886 A | * | 2/1973 | Klomp | ...................... 15/250.04 |

FOREIGN PATENT DOCUMENTS

| DE | 693496 | * | 7/1940 | ............... 15/250.04 |
| FR | 1271508 | * | 8/1961 | ............... 15/250.41 |
| JP | 226459 | * | 9/1989 | ............... 15/250.41 |
| RU | 1110438 | * | 8/1984 | ............... 15/250.04 |

\* cited by examiner

Primary Examiner—Gary K. Graham

(57) ABSTRACT

A wiper assembly for cleaning a windshield while supplying cleaning fluid thereto, comprising the usual motor-driven reciprocating arm, and a wiper member in the form of an elongated hollow body having fluid passages therein extending from a inlet to an outlet. The hollow body has an inner side for contacting a windshield and which is open so that fluid within the passages can contact the windshield, while peripheral wiper blades restrict flow of fluid along the windshield and out of the body, beyond the blades. A supply conduit leads from a pumped supply of cleaning fluid to the hollow body inlet, and an outlet conduit leads from the outlet to a reservoir, so that fluid which has entered the hollow body through the inlet and has served to clean the windshield can pass through the outlet conduit back to the reservoir, without passing into the environment.

6 Claims, 3 Drawing Sheets

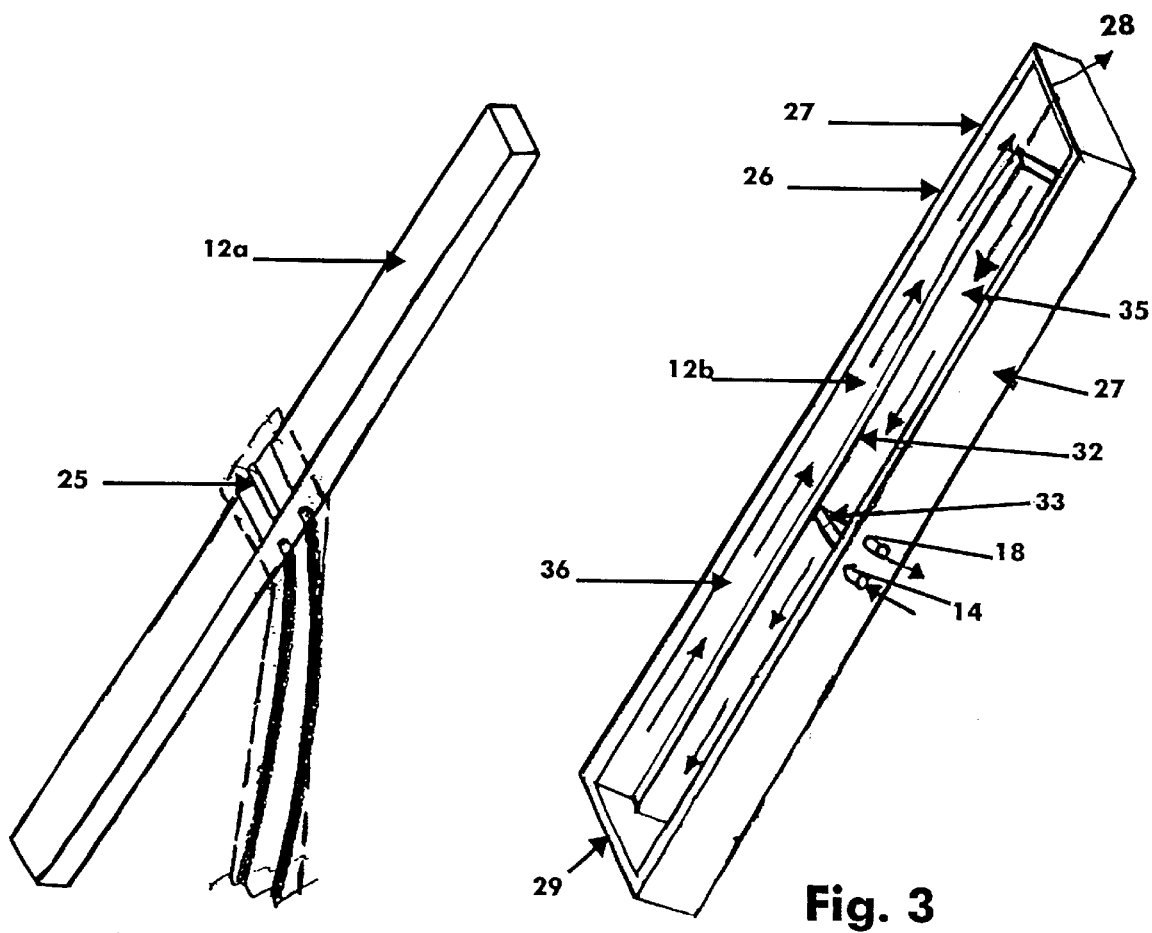
Fig. 2
Fig. 3
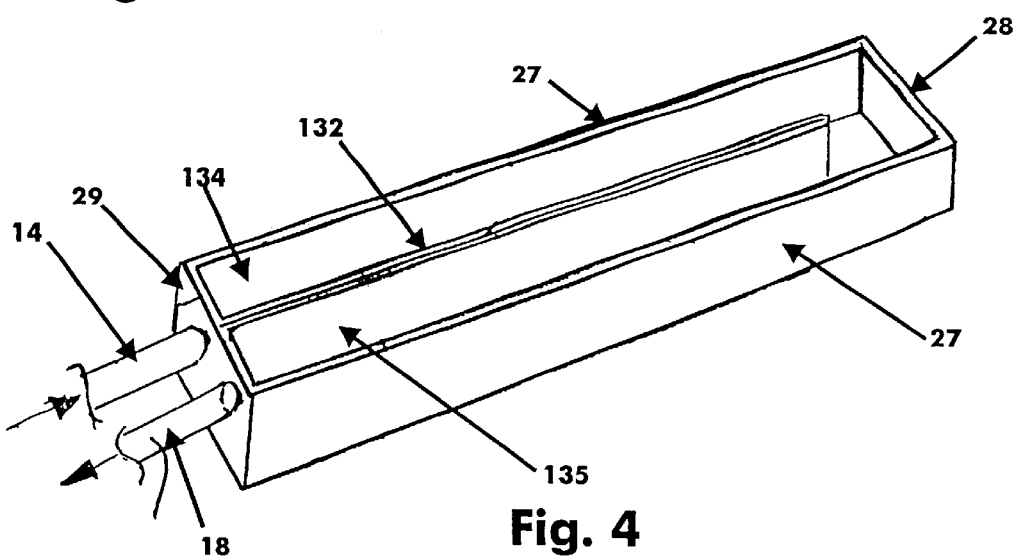
Fig. 4

ENVIRONMENTALLY FRIENDLY WINDSHIELD WIPER AND CLEANING ASSEMBLY

BACKGROUND OF THE INVENTION

1. Field of the Invention

The present invention relates to a windshield wiper and cleaning assembly which allows washing of a windshield with little pollution of the environment by the washing fluid. The fluid is preferably filtered and recycled.

2. Prior Art

Commonly used vehicle windshield wipers are simple wiper blades designed principally for keeping the windshield free of rain drops. These wiper blades can also be used for washing the windshield by the use of a device which sprays washing fluid onto the areas of the windshield close to the blades which are then operated to clean the windshield. The contaminated fluid, which contains chemicals including anti-freeze, passes from the windshield into the environment where it pollutes ground water, eventually passing into rivers and oceans. It is an object of the invention to reduce such pollution by retaining much or all of the contaminated washing fluid within the vehicle. In a preferred embodiment, the fluid is filtered and reused for further washing; this reduces the need to continually buy fluid.

The invention makes use of a wiper which is provided with its own supply of washing fluid. Such a wiper is described in U.S. Pat. No. 5,291,627, which issued Mar. 8, 1994 to Liou; however the wiper described in this prior patent merely sprays the fluid onto the windshield and does not deal with the environmental problem.

SUMMARY OF THE INVENTION

In accordance with this invention, a windshield wiper assembly for washing a windshield while supplying washing fluid thereto comprises the usual motor-driven reciprocating arm which carries a special wiper member which is in the form of an elongated hollow body having a fluid passage therein extending from an inlet to an outlet. The body has an inner side for contacting a windshield, and this inner side is open to the fluid passage so that fluid within the passage can contact the windshield, the inner side being surrounded by peripheral wiper blades which restrict flow of fluid beyond the blades. A supply conduit leads from a supply of washing fluid to the inlet of the hollow body, and an outlet conduit leads from the hollow body and is connected to a reservoir for receiving contaminated fluid.

with this arrangement, washing fluid which has been pumped into the hollow body through the inlet conduit and has served to clean the windshield can pass through the outlet conduit back to the reservoir, and little or none of this fluid passes into the environment.

In addition to the usual pump for supplying the fluid, the assembly may further comprise a vacuum pump connected to extract the contaminated fluid from the hollow body through the outlet conduit. Preferably, the assembly includes a filter which is part of the reservoir, and the vacuum pump is effective for drawing contaminated fluid from the outlet conduit and assists in passing the fluid through the filter.

The hollow body passage may include both an inlet passage portion connected to the inlet conduit, and an outlet passage portion connected to the outlet conduit, and preferably both of these passage portions are on the inner open side of the hollow body so as to be in contact with the windshield. The fluid passage portions are separated by a further, intermediate wiper blade.

In one arrangement, the passages in the hollow body include inlet and outlet passages connected to opposite ends of an intermediate passage which is also on the open side of the body, and the inlet and outlet conduits are both connected to a central part of the body, this central part being also connected to the reciprocating arm.

In another arrangement, the inlet and outlet conduits are both connected to a common, inner end of the hollow body, and this end is also connected to the reciprocating arm.

BRIEF DESCRIPTION OF THE DRAWINGS

Preferred embodiments of the invention will now be described by way of example with reference to the accompanying drawings, in which;

FIG. 2 is a more detailed view of the outside of a wiper, with part of a wiper arm also shown in broken lines;

FIG. 3 is a perspective view of the underside of the wiper member of FIG. 2, showing the passages;

FIG. 4 is an underside view of an alternative wiper member.

DETAILED DESCRIPTION

Figure 1:
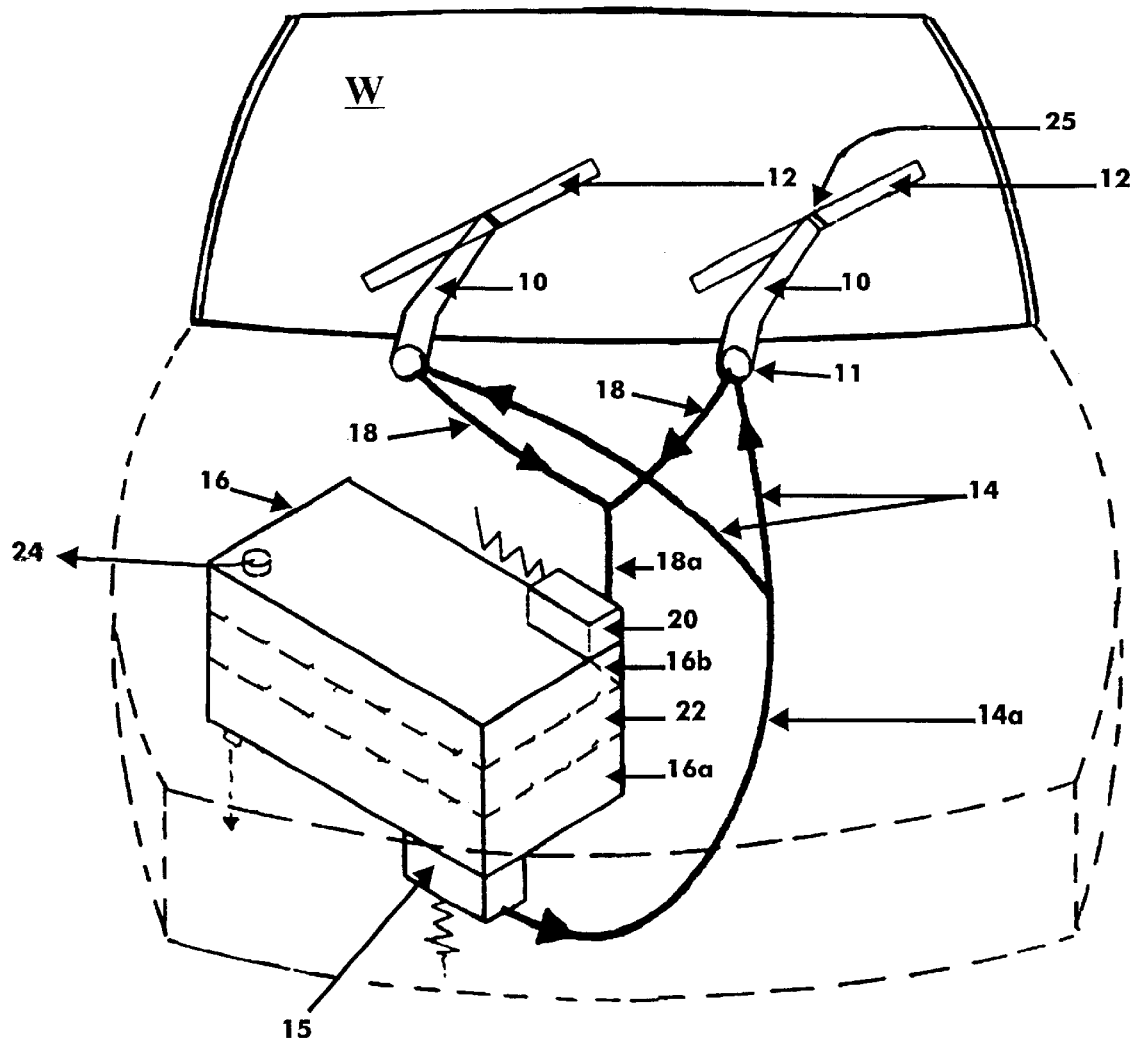
FIG. 1 is a perspective view of one embodiment of windshield wiper assembly according to the invention, shown on the windshield of an automobile the front of which is shown in broken lines.

FIG. 1 shows a wiper assembly for a windshield W in which two parallel pivoting wiper arms 10 are reciprocated in the usual manner by respective motor driven shafts 11, each arm carrying a wiper member 12 made in accordance with the invention; these members are further described below. The motor driven shaft arrangement is generally conventional, although the motors should be more powerful than is usual since the wiper members 12 are heavier than the conventional wiper blades and will give more friction against the windshield.

FIG. 1 also shows, for each wiper, an inlet fluid conduit 14 which leads from a pump 15 at the lower portion 16a of a washing fluid reservoir 16, via a common connecting conduit 14a, to the base of the respective wiper arm 10, with each conduit 14 extending up underneath the wiper arm 10 to the wiper member 12. Similarly, an outlet conduit 18 leads from each wiper member 12 down underneath the arm 10 and into a connecting conduit 18a which leads to a vacuum pump 20 which has its outlet leading into an upper portion 16b of the reservoir. The conduits are flexible hoses parts of which are concealed under the wiper arms. The reservoir is provided with a filter 22 between the upper and lower portions, this being preferably a multi-layer fiber or synthetic material. The pumps are effective to circulate washing fluid from the lower portion 16a, through the conduits and wiper members, through the upper portion 16b of the reservoir, and then through the filter 22 back to the reservoir lower portion. The reservoir also has a filling inlet 24 to make up any losses in fluid.

FIGS. 2 and 3 show details of one of the wiper members 12. Each is a hollow elongated body having a generally broad, U-shaped cross-section, with a closed outer side 12a and an inner side 12b which is open to the windshield. As indicated in FIGS. 1 and 2, the wiper member has a central pivot 25 which is connected to the arm 10. As shown in FIG. 3, the inner side 12b is surrounded by peripheral wiper blades 26 including outer longitudinal blades 27 and upper and lower end blades 28 and 29. In addition, an intermediate blade 32 extends along the center of the wiper member and has its ends spaced from the end blades 28 and 29, and has its center connected to a wall of the member by a divider wiper 33.

As shown in FIG. 3, the passageways formed between these blades include an inlet passage 34 connecting one end of the member to the inlet conduit 14 which is attached to an inlet port near to the center of the member below the divider wiper 33, an outlet passage 35 connecting the opposite end of the member to an outlet port which receives the outlet conduit 18 which is attached to the member near its center above the divider wiper 33. An intermediate passage 36 runs the full length of the member and connects the outer ends of the passages 34 and 35. The peripheral blades 27, 28, and 29 prevent substantial flow of fluid beyond these blades, and blades 32 and 33 effectively separate the passageways, so that flow is essentially from the inlet conduit 14 to the inlet passage 34, intermediate passage 36 and then through outlet passage 35 back to the outlet conduit 18.

During rain, the two longitudinal wiper blades 27 operate in the usual manner to clear the windshield of rain drops. When washing is required, the pumps 15 and 20 are operated to draw clean washing fluid from the reservoir portion 16a, through conduits 14a and 14, and through the passages 34, 36 and 35 while the fluid contacts the windshield and the wipers reciprocate to effect washing. The peripheral wiper blades 27, 28 and 29 largely prevent the fluid from spreading over the windshield and from there getting into the environment. The contaminated fluid is drawn through the conduits 18 and 18a back into the pump 20, passing into the upper portion 16b of the reservoir and then through the filter 22 which removes dirt before the cleaned fluid passes back into the lower portion 16a of the reservoir.

While filtration of the fluid is desirable, it is not an essential of the invention, since the contaminated fluid may merely be stored in the lower portion of the reservoir and disposed of in an environmentally acceptable way.

FIG. 4 shows a slightly simpler version of the wiper member having two passages, namely an inlet passage 134 and an outlet passage 135, the passages being separated by a dividing, central wiper blade 132 which extends from the lower end of the wiper member to within a short distance from the upper end blade 28, allowing fluid to flow around its upper end between the two passages. The fluid is confined by peripheral blades 27, 28 and 29 as before.

Figure 5:
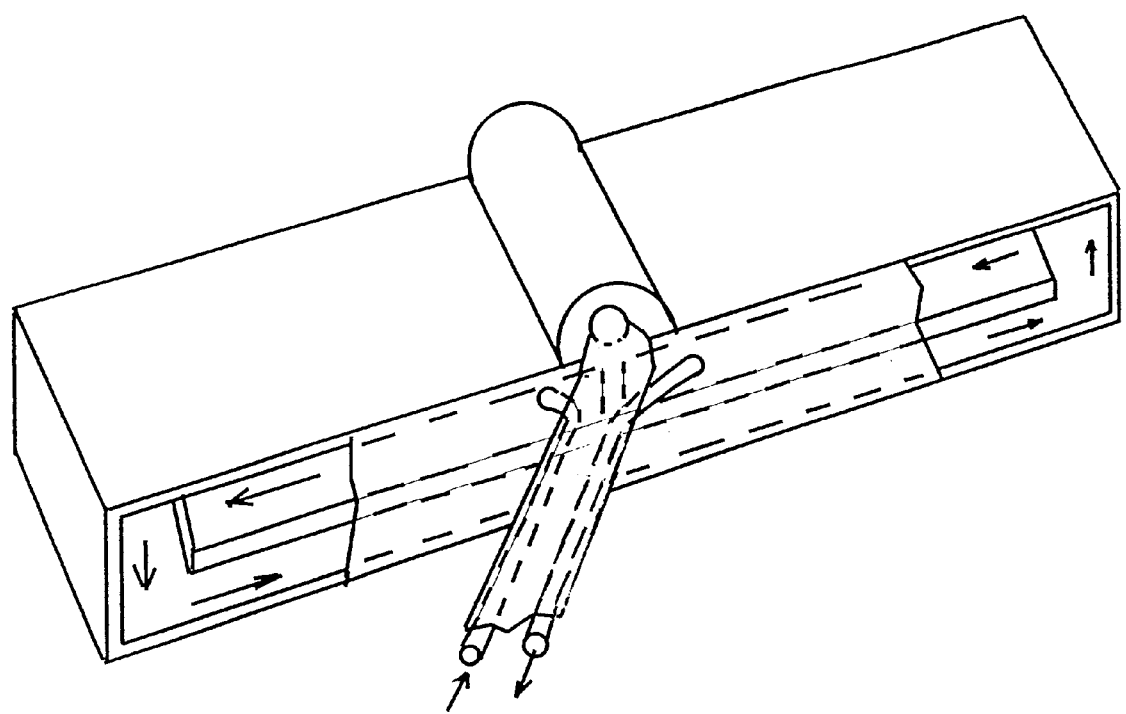
FIG. 5 is a view of another alternative wiper member.

A further embodiment, as shown in FIG. 5, has a single passage in contact with the windshield and extending the length of the member, and has inlet and outlet passages connected to inlet and outlet ports which are near the center of the member, as in FIG. 3, but the latter passages are not in contact with the windshield.

It may be possible to operate the system as described with only one pump, the vacuum pump being optional. Also, the vacuum may be provided by the engine.

In a modified form, the invention can be operated in two modes, including a re-cycling mode and a non-recycling, conventional mode. This form of the invention has an additional reservoir and supply pump, and, as is conventional, nozzles which spray fluid close to the wiper members. A switch is provided to allow switching between the conventional spray mode and the recycling mode described above.

I claim:

1. A windshield wiper assembly for cleaning a windshield while supplying cleaning fluid thereto, comprising:

a motor-driven reciprocating arm;

a wiper member in the form of an elongated hollow body having a connection to said arm for movement therewith, said hollow body having a fluid passage therein extending from an inlet to an outlet, said hollow body having an inner side for contacting a windshield and which is open so that fluid within the passage can contact the windshield, said inner side being surrounded by wiper blades which restrict flow of fluid along the windshield and out of the body, beyond said blades;

a supply conduit leading from a pumped supply of cleaning fluid to said inlet of the hollow body;

an outlet conduit leading from said outlet of the hollow body, and:

a reservoir for receiving fluid from said outlet conduit, said fluid passage including both an inlet passage portion connected to said supply conduit and an outlet passage portion connected to said outlet conduit, both of said inlet and outlet passage portions communicating with said inner open side of the hollow body so that fluid in said passage is in contact with the windshield in moving through both said passage portions, said passage portions being separated by a further, intermediate wiper blade, whereby fluid which has entered the hollow body through the inlet and has served to clean the windshield can pass through the outlet conduit back to the reservoir, without leaving the wiper assembly.

2. A windshield wiper assembly according to claim 1, further comprising a vacuum pump connected to extract contaminated fluid from the hollow body through said outlet conduit.

3. A windshield wiper assembly according to claim 1, wherein said assembly includes a filter, and has pump means effective for drawing contaminated fluid from the outlet conduit and passing the fluid through the filter and into the supply conduit for re-use.

4. A windshield wiper assembly according to claim 1, wherein said supply and outlet conduits are both connected to a central part of said hollow body, and this central part is located adjacent to the connection between said body and said reciprocating arm.

5. A windshield wiper assembly according to claim 1, wherein said supply and outlet conduits are both connected to a common, inner end of the hollow body, and this end is located adjacent to the connection between said body and said reciprocating arm.

6. A windshield wiper assembly for cleaning a windshield while supplying cleaning fluid thereto, comprising:

a motor-driven reciprocating arm;

a wiper member in the form of an elongated hollow body having a connection to said arm for movement therewith, said hollow body having a fluid passage therein including a main passage extending the length of the wiper member from an inlet passage portion to an outlet passage portion at opposite ends thereof, said hollow body having an inner side for contacting a windshield and which is open so that fluid within the main passage can contact the windshield, said inner side being surrounded by wiper blades which restrict flow of fluid along the windshield and out of the body, beyond said blades;

a supply conduit leading from a pumped supply of cleaning fluid to an inlet of the hollow body;

an outlet conduit leading from an outlet of the hollow body, and:
a reservoir for receiving fluid from said outlet conduit, said inlet passage portion connected to said supply conduit via said inlet and said outlet passage portion connected to said outlet conduit via said outlet,
and wherein said supply and outlet conduits are both connected to a central part of said hollow body, and this central part is located adjacent to the connection between said body and said reciprocating arm,
whereby fluid which has entered the hollow body through the inlet and has served to clean the windshield can pass through the outlet conduit back to the reservoir, without leaving the wiper assembly.

* * * * *